United States Patent [19]

Cedoz

[11] Patent Number: 4,642,029
[45] Date of Patent: Feb. 10, 1987

[54] BRAKE FOR COUNTER ROTATING BLADED MEMBERS

[75] Inventor: Robert W. Cedoz, Indianapolis, Ind.

[73] Assignee: General Motors Corporation, Detroit, Mich.

[21] Appl. No.: 745,439

[22] Filed: Jun. 17, 1985

[51] Int. Cl.⁴ .............................................. B64C 11/48
[52] U.S. Cl. ................................ 416/129; 416/169 R; 416/170 R; 416/32
[58] Field of Search .................. 416/128, 129, 169 R, 416/32, 170 R

[56] References Cited

U.S. PATENT DOCUMENTS

| | | | |
|---|---|---|---|
| 2,312,624 | 3/1943 | Caldwell | 416/169 X |
| 2,482,460 | 9/1949 | Browne | 416/32 |
| 2,702,100 | 2/1955 | Montieth | 416/169 X |
| 2,826,255 | 3/1958 | Peterson | 416/32 |
| 3,646,834 | 3/1972 | Davis | 74/674 |
| 3,679,033 | 7/1972 | Wagner | 416/169 X |
| 4,376,614 | 3/1983 | Woodruff | 416/32 |
| 4,567,965 | 2/1986 | Woodruff | 416/32 X |

FOREIGN PATENT DOCUMENTS

| | | | |
|---|---|---|---|
| 830740 | 8/1938 | France | 416/128 |
| 840360 | 4/1939 | France | 416/129 |
| 851130 | 1/1940 | France | 416/169 |
| 1310472 | 3/1973 | United Kingdom | 416/129 |

Primary Examiner—Everette A. Powell, Jr.
Attorney, Agent, or Firm—Saul Schwartz

[57] ABSTRACT

In an aircraft propulsion system including a gas turbine engine driving a pair of counter rotating bladed members through a planetary gear set, a brake for simultaneously retarding rotation of both bladed members after engine shut-down includes a pair of concentric transfer shafts each rotatably connected to separate elements of the planetary gear set, a pair of friction plates supported on respective ones of the transfer shafts for rotation therewith, a plurality of non-rotatable reaction members between the friction plates, and a single actuator selectively operable to compress the stack of friction plates and reaction members to simultaneously retard rotation of both transfer shafts and thereby simultaneously retard rotation of and eventually simultaneously stop both of the counter rotating bladed members.

4 Claims, 1 Drawing Figure

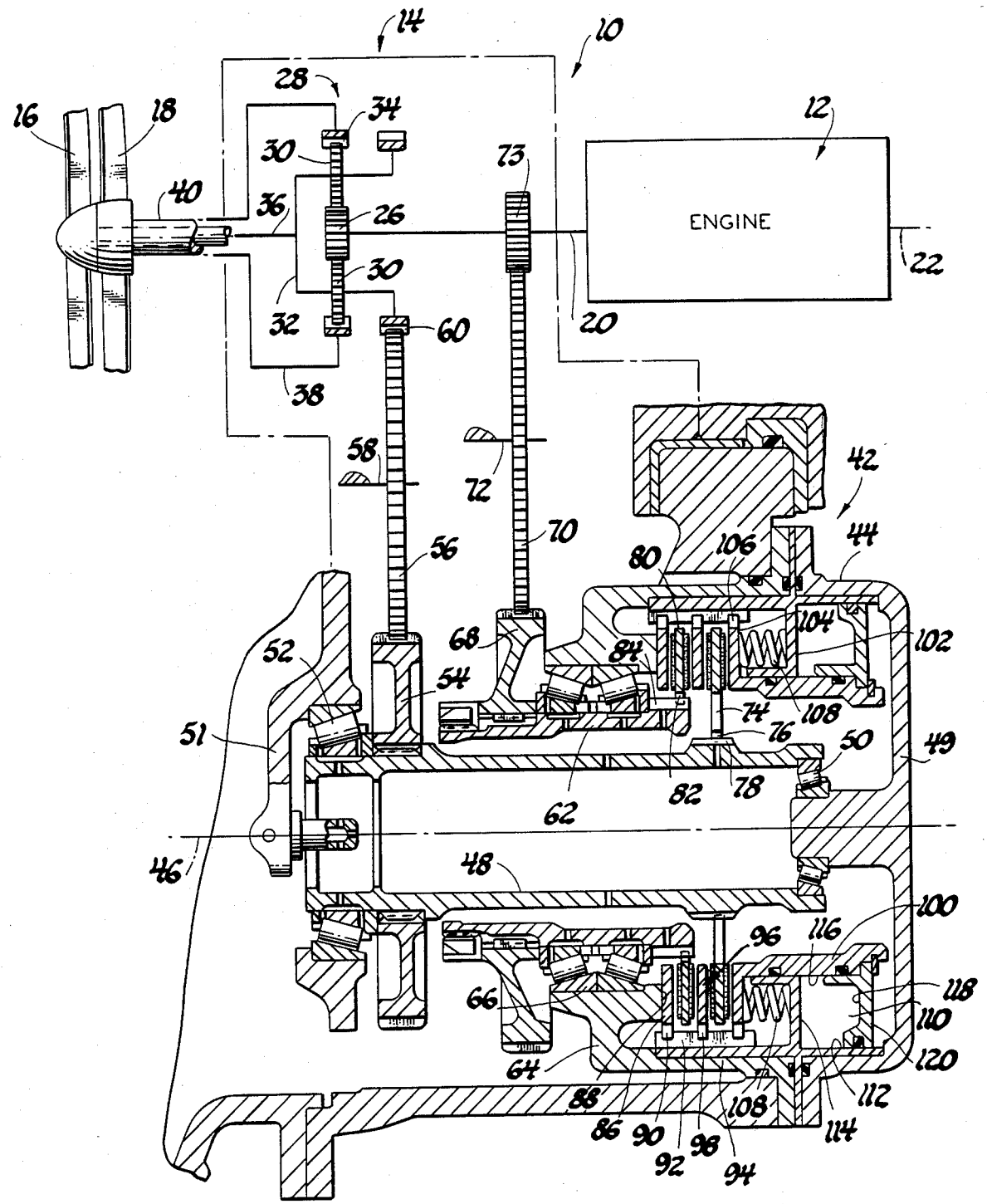

BRAKE FOR COUNTER ROTATING BLADED MEMBERS

The invention herein described was made in the course of work under a contract or subcontract thereunder with the Department of Defense.

FIELD OF THE INVENTION

This invention relates generally to aircraft propulsion systems and, more particularly, to a brake for counter rotating bladed members in such systems.

DESCRIPTION OF THE PRIOR ART

Propeller brakes have been used extensively in aircraft propulsion systems to minimize propeller freewheeling after engine shut-down. Typically, such brakes react directly on the propeller shaft. In an advanced aircraft propulsion system, sometimes referred to as a propfan, free fan or unducted fan system, the output shaft of a gas turbine engine drives the sun gear of a planetary set while a pair of counter rotating bladed members are connected through concentric drive shafts to respective ones of the carrier and ring gear of the planetary set. In such a system, a single brake reacting directly on any one shaft or element of the planetary set will not stop both bladed members. Multiple brakes with multiple actuators could be employed, but with a probable cost and/or space penalty relative to simpler, single brake or actuator systems. A brake according to this invention incorporates in a single structural assembly with one actuator, a simple and efficient arrangement for simultaneously braking counter rotating bladed members and, therefore, represents an improvement over known multiple brake or multiple actuator systems.

SUMMARY OF THE INVENTION

Accordingly, the primary feature of this invention is that it provides a new and improved brake for simultaneously stopping counter rotating bladed members in an aircraft propulsion system including a gas turbine engine and a planetary gear drive between the engine and the counter rotating bladed members. Other features of this invention reside in the provision in the new and improved brake of a pair of concentric transfer shafts connected through accessory gear trains to two of the three elements of the planetary gear set and in the provision of a non-rotating clutch having a single actuator operative to simultaneously retard rotation of both transfer shafts and, thereby, the rotating elements of the planetary gear set and both bladed members. Still another feature of this invention resides in the provision in the new and improved brake of a non-rotating clutch including a plurality of non-rotating reaction members, at least one rotating friction plate on one of the transfer shafts disposed between a pair of the reaction members, at least one rotating friction plate on the other of the transfer shafts disposed between another pair of reaction members, and an actuator operative to compress the stack of rotating and non-rotating plates and members and thereby simultaneously retard rotation of both transfer shafts. And still another feature of this invention resides in the provision in the new and improved brake of an actuator wherein a plurality of springs constantly bias a piston toward an extended position compressing the stack of plates and members and hydraulic fluid in a pressure chamber is operative to withdraw the piston to a retracted position wherein the stack of plates and members is uncompressed so that the transfer shafts are freely rotatable.

These and other features of this invention will be readily apparent from the following specification and from the drawings wherein:

A single drawing FIGURE shows a brake according to this invention in sectional view in combination with a schematically illustrated advanced aircraft propulsion system with counter rotating bladed members.

Referring to the single drawing figure, a schematically illustrated advanced aircraft propulsion system 10 referred to generally as a propfan, free fan or unducted fan system, includes a turboshaft gas turbine engine 12, a transmission or gear box 14 and a pair of bladed members 16 and 18. The bladed members 16 and 18 resemble multi-bladed aircraft propellers, but typically exhibit more pronounced curvature than conventional propellers. In the following description, the bladed members 16 and 18 will be referred to simply as far propeller 16 and near propeller 18, respectively.

The gas turbine engine 12, the specific internal structure of which forms no part of this invention, is supported on the aircraft, not shown, and includes an output shaft 20 rotatable about an axis 22. The output shaft 20 projects into the gear box 14 and has rigidly attached thereto within the gear box a sun gear 26 of a planetary gear set 28 disposed within the gear box 14. The planetary gear set 28 further includes a plurality of planet gears 30 rotatably supported on a carrier 32 and meshing with the sun gear 26 and with a ring gear 34. The carrier 32 is supported on the gear box 14 for rotation about the axis 22 and has rigidly attached thereto one end a first or center output shaft 36 the other end of which is connected to the far propeller 16. A drum 38 is rigidly connected to the ring gear 34 and is supported on the gear box 14 for rotation about the axis 22. A tubular output shaft 40 is disposed around the center output shaft 36 and has one end connected to the drum 38 and the other end connected to the near propeller 18.

When the engine 12 is operating, the output shaft 20 and the sun gear 26 rotate at high speed. Because the propellers 16 and 18 and corresponding connected elements of the planetary gear set represent reaction members, the input power developed at the sun gear 26 is split between the ring gear and the planet carrier. Accordingly, the unit consisting of the carrier 32, the center output shaft 36 and the far propeller 16 rotate in one direction while the unit consisting of the ring gear 34, the drum 38, the tubular output shaft 40 and the near propeller 18 rotate in the opposite direction. After engine shut-down, propellers 16 and 18 continue to freewheel for a considerable period of time. A brake 42 according to this invention is disposed on the gear box 14 and cooperates with the input shaft 20 and the planetary gear set 28 to retard freewheeling of the propellers 16 and 18.

The brake 42 includes a stationary housing portion 44 of the gear box 14 which housing portion defines an axis 46 parallel to the axis 22. A first tubular transfer shaft 48 is supported at one end on a first wall 49 of the housing portion 44 by a bearing 50 and at the other end on a second wall 51 of the housing portion 44 by a bearing 52 for rotation about the axis 46. The first transfer shaft 48 has a gear 54 mounted thereon for unitary rotation therewith which gear meshes with an accessory gear train gear 56 supported on the gear box 14 for rotation about a pivot 58. The gear 56 meshes with a gear 60 rigidly attached to the carrier 32. Accordingly, whenever the far propeller 16 rotates, the gears 56 and 54 and the first transfer shaft 48 likewise rotate.

The brake 42 further includes a second tubular transfer shaft 62 centrally supported on an inturned flange 64 of the housing portion 44 by a bearing 66 for rotation about the axis 46 and in concentric relationship with the first transfer shaft 48. A gear 68 on the second transfer shaft 62 rotates as a unit therewith and meshes with an accessory gear train gear 70 supported on the gear box 14 for rotation about a pivot 72. The gear 70 meshes with a gear 73 rotatable as a unit with the output shaft 20 so that whenever the output shaft rotates, the second transfer shaft 62 likewise rotates.

A first annular friction plate 74 disposed in a plane perpendicular to the axis 46 has a plurality of internal spline teeth 76 slidably received on a corresponding plurality of external splines 78 on the first transfer shaft 48 whereby the friction plate 74 is rotatable as a unit with the transfer shaft. Similarly, a second annular friction plate 80 is disposed in a plane perpendicular to the axis 46 and has a plurality of internal spline teeth 82 slidably received on a corresponding plurality of external splines 84 on the second transfer shaft 62 whereby the friction plate 80 is rotatable as a unit with the second transfer shaft. A first annular reaction member or plate 86 is disposed in a plane perpendicular to the axis 46 between the second friction plate 80 and a reaction surface 88 on the inturned flange 64 of the stationary housing portion 44 with a plurality of external spline teeth 90 slidably engaged on a corresponding plurality of internal splines 92 formed on a cylindrical wall 94 of the stationary housing portion 44. A second annular reaction member or plate 96 is disposed between the second friction plate 80 and the first friction plate 74 with a plurality of external spline teeth 98 slidably engaged on the internal splines 92.

The brake 42 further includes a single actuator in the form of an annular piston 100 slidably disposed on an inturned web 102 of the stationary housing portion 44. The piston 100 includes a radially outwardly extending flange 104 disposed on the opposite side of friction plate 74 from second reaction plate 96. The flange 104 has a plurality of external spline teeth 106 slidably received in the splines 92 on the cylindrical wall 94 so that while the piston 100 is axially slidable relative to axis 46, rotation of the piston and the reaction member defined by flange 104 about the axis is foreclosed. A plurality of compression springs 108 are disposed between the inturned web 102 and the flange 104 of the piston 100 whereby the flange 104 is urged against the first friction plate 74 so that the stack of friction plates and reaction plates is compressed against the reaction surface 88. The springs 108 compress the stack of friction and reaction plates with sufficient force to prevent rotation of the transfer shafts 48 and 62 about the axis 46.

An annular fluid pressure chamber 110 has an outer wall 112 formed by a portion of the cylindrical wall 94, a first radial wall 114 formed by the inturned web 102, an inner wall 116 formed by a portion of the piston 100, and a second radial wall 118 formed by an end plate 120 carried by the piston and sealingly slidable within the cylindrical wall 94 of the housing portion 44. The chamber 110 is selectively hydraulically pressurized and exhausted by conventional means, not shown, such that when pressurized the piston 100 is withdrawn to the right to a retracted position wherein the springs 108 are compressed and the first and second friction plates 74 and 80 are freely rotatable and when exhausted the piston is projected to the left by the springs to an extended position wherein the stack of friction and reaction plates is compressed against reaction surface 88 to retard rotation of the friction plates.

Describing, now, the operation of the brake 42, whenever the engine 12 delivers power to the output shaft 20, the pressure chamber 110 is filled with pressurized hydraulic fluid whereby the piston 100 is withdrawn to the retracted position freeing the friction plates 74 and 80 for unimpeded rotation. Accordingly, the transfer shafts 48 and 62 and corresponding ones of the gears 54, 56, 68 and 70 freewheel while adequate lubrication and the relatively low masses of the freewheeling elements reduce windage losses to acceptable minimum levels.

At engine shut-down, the hydraulic fluid in the pressure chamber 110 is exhausted permitting the springs 108 to compress the stack of friction plates 74 and 80 and reaction plates 86 and 96 between the flange 104 on the piston and the reaction surface 88. As fluid is exhausted from the chamber 110, the compression force progressively increases and simultaneously increases the friction drag on the friction plates 74 and 80 which drag retards rotation of the first and second transfer shafts 48 and 62. Accordingly, freewheel rotation of the output shaft 20 and the planetary carrier 32 is likewise retarded, respectively, through the gears 68, 70 and 73 and through the gears 54, 56 and 60. Since stopping any two elements of a planetary gear set will completely stop the entire planetary set and since output shaft 20 is rigidly connected to the sun gear 26, the brake 42 simultaneously retards and eventually stops the carrier 32 and the sun gear 26 of the planetary set. Accordingly, within a relatively short period of time, the freewheel energy of the propellers 16 and 18 and the connected rotating elements is dissipated as heat developed between the rotating friction plates and the stationary reaction plates and the propellers are brought to a halt.

The embodiments of the invention in which an exclusive property or privilege is claimed are defined as follows:

1. In a propulsion system including a gas turbine engine having an output shaft and a gear drive having a planetary gear set with a first element connected to said engine output shaft and a second element connected to a first bladed member and a third element connected to a second bladed member whereby said first and second bladed members are rotated in opposite directions by said output shaft, a brake comprising, a first transfer shaft supported on a stationary housing for rotation about an axis of the latter, a second transfer shaft supported on said stationary housing for rotation about said axis, gear means between one of said counter rotating bladed members and said first transfer shaft, gear means between the other of said counter rotating bladed members and said second transfer shaft, a selectively operable brake actuator on said housing movable between an extended position and a retracted position, and friction means between said brake actuator and each of first and said second transfer shafts operative in said extended position of said brake actuator to simultaneously frictionally retard rotation of each of said first and said second transfer shafts whereby each of said counter rotating bladed members is simultaneously braked.

2. The brake recited in claim 1 wherein said first and said second transfer shafts are disposed in concentric relationship about said axis of said stationary housing.

3. The brake recited in claim 2 wherein said friction means includes a first friction plate supported on said first transfer shaft for rotation as a unit therewith, a second friction plate supported on said second transfer shaft for rotation as a unit therewith and in a plane parallel to the plane of said first friction plate, and a plurality of reaction members disposed on opposite sides of each of said first and said second friction plates and non-rotatably supported on said housing, said brake actuator in said extended position thereof compressing the stack of said first and said second friction plates and said reaction members against a reaction surface of said housing thereby to simultaneously retard rotation of said first and said transfer shafts and simultaneously brake each of said counter rotating bladed members.

4. The brake recited in claim 3 wherein said brake actuator on said stationary housing includes an annular piston disposed on said stationary housing for shiftable movement between said extended and said retracted positions, a plurality of springs between said piston and said stationary housing biasing said piston toward said extended position, means defining an annular expansible fluid chamber between said piston and said housing, and means operative to selectively pressurize said expansible chamber with fluid whereby said piston is shifted against the force of said springs to said retracted position wherein rotation of each of said first and said second transfer shafts is unimpeded.

* * * * *